May 30, 1950  A. M. COHEN  2,509,262
CASCADE REGULATOR

Filed March 16, 1949  6 Sheets-Sheet 1

INVENTOR.
ARTHUR M. COHEN
BY
James and Franklin
ATTORNEYS

A. M. COHEN 2,509,262

CASCADE REGULATOR

Filed March 16, 1949

INVENTOR.
ARTHUR M. COHEN
BY
James and Franklin
ATTORNEYS.

Fig. 7

Patented May 30, 1950

2,509,262

UNITED STATES PATENT OFFICE 2,509,262

CASCADE REGULATOR

Arthur M. Cohen, New York, N. Y.

Application March 16, 1949, Serial No. 81,717

12 Claims. (Cl. 323—64)

The present invention relates to a cascade operated regulator and in particular to one in which a plurality of individual standard regulator units, each providing a limited number of steps of regulation, are combined into a unitary structure so that said individual units will act in sequence in order to provide a far larger number of steps of regulation.

Each problem involving electrical regulation, be it voltage, current, or speed regulation, is unique and requires individual attention. If the expected conditions to be regulated will vary over an exceptionally wide range, regulation of the step-by-step type is best achieved by increasing the number of the regulatory circuit elements, usually resistors, which are sequentially inserted into the circuit to compensate for the change in conditions. However, if the regulator being used has a fixed number of steps of regulation, for example, ten steps, the operating condition being controlled can be controlled only roughly by increasing the magnitude of each individual regulatory circuit element. Precise regulation necessitates that the magnitude of regulation accomplished by each step be retained at a minimum. Hence, if accurate regulation is to be accomplished when the operating conditions are expected to vary over an exceptionally wide range, it has in the past been necessary to utilize step-by-step regulators having a greater number of steps than is normally required. Regulators for such special applications have therefore been exceedingly expensive since they have had to be tailor-made to the particular application involved. Thus, if in one instance ten steps are required to regulate within 1%, a ten step regulator is purchased. If in another application twenty or forty steps are required, a twenty or forty step regulator must be purchased. As a result, the manufacture of step-by-step regulators has not been standardized to any great degree, at least not for special applications.

One expedient which has been adopted is to attempt to standardize step-by-step regulator constructions to one with a relatively large number of steps so that said standardized unit will be useable in a greater number of instances. However, this has the prime economic disadvantage that if twenty steps are provided but only ten steps are needed, the purchaser of the regulator must pay for the additional cost involved in the production of ten unneeded steps. Consequently, this expedient has not met with ready acceptance on the part of the industry. Moreover, when a large regulator with a large number of steps is employed, the moment of inertia of the moving parts is necessarily so great as to materially reduce the speed of reaction of the regulator when compared to one of a smaller size.

When tailor-made regulators are employed, the problem of initial cost is only one disadvantage. The user of such a regulator may require instant replacement and unless the manufacturer carries a large inventory of units which may be desired only by one customer, and may not be required by that customer at all, he will be unable to satisfy the customer and the customer will be unwilling to purchase the initial regulator.

Attempts have in the past been made to utilize a plurality of identical regulators so as to be operable in sequence and thus provide, in special applications, the required number of steps. This avenue of approach also has not met with ready acceptance because adjustment of the individual regulators so that they could operate in sequence required great care and skill, and even under the best circumstances those adjustments become disaligned so as to require constant attention. In addition, the industry has evidenced a marked reluctance to adopt special circuits and special installations involving elaborate and usually exposed connections between units.

In order to avoid all of the above disadvantages, I have devised a unitary standardized cascade regulator structure into which individual standardized step-by-step regulator units are securable in any desired number depending upon the particular application, the entire cascade unit being smaller, lighter and less expensive than most prior art individual regulators comparable in their operating characteristics to only one of the individual standardized regulator units included within my cascade regulator. The necessary connections between the individual regulator units are permanently accomplished in the cascade unit, these connections being of such a nature so to positively ensure that the respective individual regulator units will properly operate in sequence, the connections involving one preliminary adjustment of a resistance which is not particularly critical in nature and which is not susceptible of variation or deterioration. The entire unit is of the plug-in type, the regulating resistances being external thereto so that the cascade unit may be standardized according to the desired number of steps of regulation, thus eliminating the necessity of designing special regulator units for each application depending upon the desired regulating resistances. It must be borne in mind that while many specific applications require the same number of regulating steps, almost every specific application requires the use of different magnitudes of resistances in the steps.

It has been found that in all but the most exceptional circumstances approximately forty steps of regulation are all that are necessary. Since the individual regulator units, as disclosed in my copending applications, Ser. No. 34,517, filed June 22, 1948, and entitled "Finger type circuit regulator" and Ser. No. 49,726, filed September 17, 1948, and entitled "Finger type circuit regulator, contact assembly therefor, and method of making same," have ten regulating steps, the cascade regulator unit is here disclosed as using four individual regulator units. If a particular application requires only twenty or thirty steps, then only two or three individual regulator units need be included in the cascade unit and since the individual regulator units constitute by far the greatest proportion of the cost of the cascade unit, the purchaser of a twenty or thirty step regulator will be paying substantially only for the number of steps needed and no more.

The structure of the cascade unit, apart from the individual regulator units, is simple and sturdy and not subject to disarrangement. It consists of a base plate, contact prongs and a number of adjustable and fixed resistances, together with the necessary electrical connections. If any of the resistances in the circuit should fail, the construction is such that they can be individually replaced in a simple manner. It should be noted that these resistances are not the regulatory resistances, and hence need not vary in fixed magnitude from application to application. They are, therefore, of standardized values. If one of the individual regulator units should fail, that unit alone can be individually replaced by another standardized individual unit, thus materially reducing the cost of repair and replacement and permitting the manufacturer to carry an inventory only of standardized parts which, at least insofar as the regulator units themselves are concerned, are useable either in the cascade unit or as individual units.

The prime object of the present invention is, therefore, to devise a cascade regulator unit which is flexible in use and requires the employment of a plurality of individual standardized parts, and particularly individual standardized regulator units.

Another object of the present invention is to devise such a cascade regulator unit in which the connections between the individual regulator units are so designed that the units will positively operate in sequence, one unit providing regulation to the extent of its ability and the next unit then taking over to continue the regulation and so on.

In order to accomplish this object, the actuating coils of the individual regulator units are connected to appropriate contacts of other regulator units by means of the resistances which are a part of the cascade unit, the contacts automatically connecting and disconnecting these resistances in the circuit so as to control the current flowing in the actuating coils and thus control the operation of the regulators. Since each regulator is designed to commence regulation when a given amount of current is flowing in its actuating coil, and to continue regulation until that current reaches a specified maximum, a resistance, hereinafter termed the "restraining resistance," is so connected to the actuating coils of each of the individual regulator units except the first one to operate as to reduce the current flowing in said actuating coils to a value below that required for regulation. Whenever the time comes for one of the regulator units to commence regulation, this resistance is automatically removed from the circuit so that the current in the actuating coil of that regulator unit can rise to its regulating value. A second resistance, hereinafter termed the "locking resistance," may also be employed in conjunction with the actuating coils of the various individual regulator units, this locking resistance, when it is in the circuit, permitting the current in the actuating coil to be of a regulating value, the locking resistor of any one individual unit being taken out of the circuit when the next regulator commences regulation, thus permitting the current in the actuating coil to which it is connected to rise to a value above the regulating value, the regulator unit in question then being locked in fully regulated position.

It is accordingly a subsidiary object of the present invention to so connect the individual regulator units, by means of locking and restraining resistances, as to ensure proper sequential operation of the individual units.

To the accomplishment of the foregoing objects and such other objects as may hereinafter appear, the present invention relates to a cascade regulator as defined in the following claims and as described in this specification, taken together with the accompanying drawings, in which:

The cascade regulator itself comprises a base plate 2 of any suitable insulating material from which a plurality of sets of connection prongs 4 depend, the cascade unit thus being adapted for plug-in operation. Space is provided on the base plate 2 for the mounting thereon of a plurality of individual regulator units here shown as four in number and designated A, B, C, and D. Each of these individual regulator units A–D is of the step-by-step type and preferably the finger type, the units comprising an actuating coil 6 and a plurality of individual contacts 8 adapted to be moved between electrically connected and disconnected positions with respect to a common lead or connection 10, the sequential movement of the contacts 8 being accomplished by operatively linking said contacts 8 to the actuating coil 6 so that as the current in the coil 6 increases, the contacts 8 will be moved in sequence away from their normal position, either connected or disconnected with respect to the common lead 10 as the case may be, into their non-normal position in which they are disconnected or connected respectively with respect to the common lead 10. Each of the individual regulator units A through D is preferably of a standardized type and is here disclosed as having the construction set forth in my aforementioned copending applications. It will be understood, of course, that other types of individual regulator units, provided that they have a step-by-step regulating operation, could be employed as well. In the regulator units as here disclosed the actuating coil 6 electromagnetically attracts an armature 12 pivotally mounted on the bottom plate 14 of the structure which supports the coil 6. The armature 12 is in turn connected to a finger lifting member 16 which is urged away from the cooperating fixed contacts 20 by means of springs 18 and which is moved toward the fixed contacts 20 so as, in the condition illustrated in Figs. 1 and 2, to sequentially lift the fingers 8 therefrom, the fixed contacts 20 in turn being electrically connected to the common lead 10. A dashpot 22 serves to damp the action of the regulator. Thus as the current in the coil 6 increases, thus exerting an electromagnetic pull on the armature 12, a force will be exerted on the armature 12 opposite to the pull of the springs 18. When the current in the coil 6 reaches a predetermined minimum value, the magnetic pull on the armature 12 will be sufficient to pivot it so as to move the finger lifting member 16, against the action of the springs 18, into engagement with the contacts 8, and a further increase in the current in the coil 6 will thus cause the contacts 8 to be moved from their normal to their non-normal position. After the last contact 8 has been moved to its non-normal position, if the current in the coil 6 should further increase, the armature 12 will be pulled flat against the plate 14 and hence all of the contacts 8 will be maintained in non-normal position. As illustrated, the contacts 8 are normally connected to the fixed contacts 20. It will be apparent, of course, that a simple modification would permit the contacts 8 to normally assume a disconnected position with respect to the fixed contacts 20 and to be moved sequentially into connected position therewith as the current in the coil 6 increases.

Figure 1:
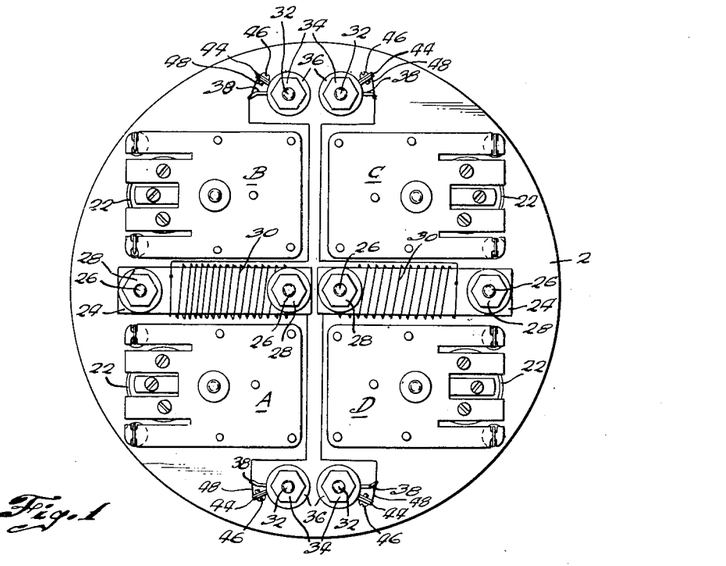
Fig. 1 is a top view of the cascade unit.
Figure 2:
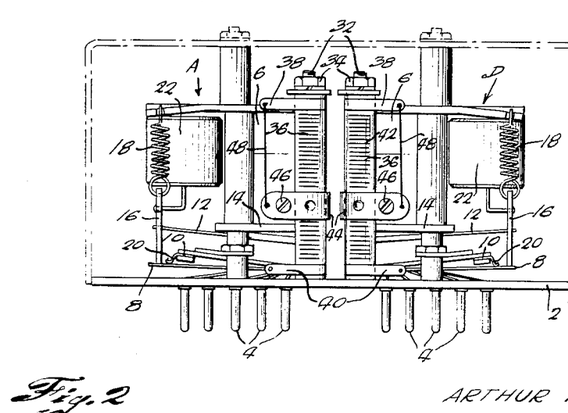
Fig. 2 is a side view thereof.

In between the individual regulators A and B and the individual regulators C and D a plurality of insulating strips 24 are mounted on the base plate 2 by screws 26 and are secured thereon by means of nuts 28. These strips 24 may be positioned one above the other separated by spacers. Resistance windings 30 are provided on the strips 24 and suitable electrical connections may be made thereto, these windings 30 being used to define the restraining resistances X and the locking resistances Y used in interconnecting the individual regulator units and ensuring their proper sequential operation.

Also mounted on the base plate 2 by means of screws 32 and nuts 34 are adjustable resistors 36. These resistors may comprise standard insulation covered windings having leads 38 and 40 going to opposite ends thereof, the insulating coatings being removed from one longitudinal portion 42 thereof so as to expose the windings, a sleeve 44 being adjustably securable along the length of the resistors by means of screw 46 so as to make contact with the appropriate portion of the exposed windings. Wires 48 may be provided connecting the leads 38 with the sleeves 44 so that the position of the sleeves 44 on the resistors 36 will determine the effective resistance thereof.

In Figs. 3 through 6, various methods of connection of the individual regulator units are disclosed. Although in those figures the regulatory resistors are shown directly connected between the contacts, it must be borne in mind that those resistors are as a matter of fact structurally separated from the regulator unit, each of the contacts 8 and the common lead 10 being connected to appropriate prongs 4 which are in turn externally electrically connected to the regulatory resistors. It will also be understood that the actuating coil 6 is connected to an external voltage source shown in Figs. 3, 4 and 6 as a load, those figures indicating the use of the regulator as a line-load regulator, and in Fig. 5 the actuating coils are shown connected across the output of a generator 50.

Figure 3:
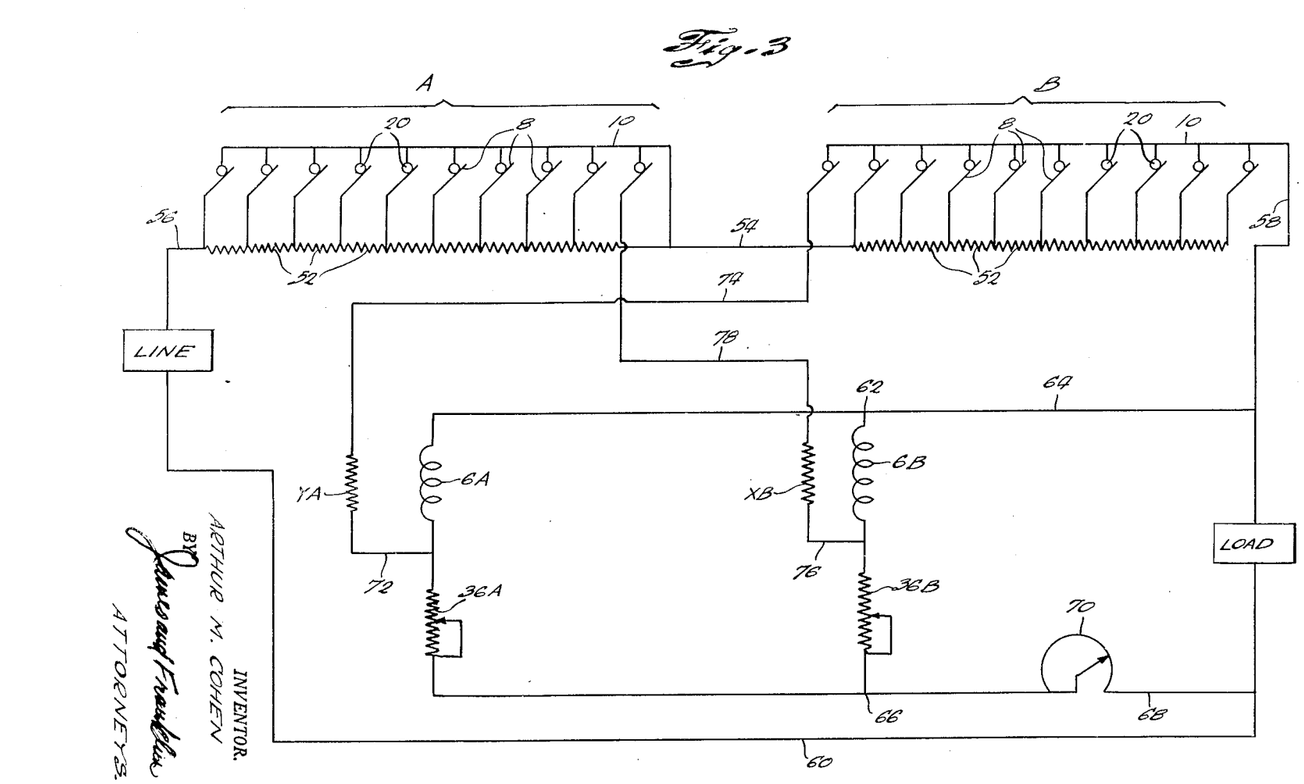
Fig. 3 is a schematic view showing the connections between two sequentially operated individual regulator units, the contacts of said units being normally closed and the regulatory resistances being arranged in series.

In Fig. 3 two regulators A and B are shown, each having actuating coils 6A and 6B and each provided with finger contacts 8 normally engaged with fixed contacts 20 in turn connected to a common lead 10, the fingers 8 being shown as ten in number. With the regulator A, which is designed to be the first to operate, a plurality of regulatory resistors 52 are connected in series between the first nine of the contacts 8 and between the ninth contact 8 and the common lead 10. In the second to operate regulator B nine separate regulatory resistors 52 are connected in series between the second through tenth of the contacts 8 and between the tenth contact and the common lead 10. The regulatory resistors 52 of the regulator A are connected to the regulatory resistors 52 of the regulator B by means of wire 54, and leads 56 and 58 at either end of the thus defined network connect the regulatory resistors 52 to one side of the line and load respectively, the other side of the line and load being connected by the connection 60. One end of each of the actuating coils 6A and 6B are connected together at 62, and are then connected by means of line 64 to one side of the load. The other ends of the actuating coils 6A and 6B are connected to one end of the adjustable resistors 36A and 36B respectively, the other ends of said resistors being connected together at 66 and connected to the other side of the load by means of line 68 in which control rheostat 70 may be located. The control rheostat 70 is external of the cascade unit. The end of the actuating coil 6A which is connected to the adjustable resistor 36A is also connected by means of line 72 to locking resistor YA, that resistor in turn being connected, by means of line 74, to the first contact 8 of the regulator B. The end of the actuating coil 6B which is connected to the adjustable resistor 36B is also connected, by means of line 76, to one end of restraining resistance XB, the other end of which is connected by means of line 78 to the last contact 8 of the regulator A.

Since the contacts 8 of the regulator units A and B are normally in connected position with respect to the common lead 10, the normal path of the current from the line to the load would be through lead 56, the first contact 8 of the regulator A, the common lead 10 thereof, the lead 54, the second contact 8 of the regulator B, the common lead 10 thereof, and the lead 58. At the same time, each of the actuating coils 6A and 6B would be connected across the load in series with the adjustable resistors 36A and 36B respectively. The locking resistor YA would be connected in shunt with the actuating coil 6A and the restraining resistor XB would be connected in shunt with the actuating coil 6B. The rheostat 70 is adjusted in accordance with the desired magnitude of the voltage at the load, so that when that desired voltage is present, the current through each of the actuating coils 6A and 6B will be insufficient to cause the regulators A and B to function. The adjustment of the rheostat 70 is made in conjunction with the adjustment of the adjustable resistors 36A and 36B which form a part of the cascade unit, the adjustable resistor 36A being so adjusted so that as soon as the voltage at the load exceeds the predetermined amount, and while the locking resistor YA is still connected in shunt with the actuating coil 6A, the current in the coil 6A will be sufficient to cause the first contact 8 of the regulator A to move to disconnected position with respect to the common lead 10, thus inserting the first regulatory resistor 52 into the circuit so as to reduce the voltage at the load. Should the voltage at the load continue to increase, the current through coil 6A will also increase and hence more and more of the contacts 8 of the regulator A will be moved to disconnected position. The adjustable resistor 36B is so adjusted that, so long as the restraining resistor XB is connected in shunt across the actuating coil 6B, the current in the actuating coil 6B will not reach the magnitude required to cause the contacts 8 of the regulator unit B to move to disconnected position. If the voltage at the load continues to increase, the first nine of the contacts 8 of the regulator A will move to disconnected position, thus putting nine of the regulatory resistors 52 in series with the load. If the voltage at the load should continue to rise, the tenth contact 8 of the regulator A will move to disconnected position, this being the contact which is connected not to a regulatory resistor 52, but instead to the restraining resistance XB, the disconnection of the last contact 8 of the regulator A from the common lead 10 opening the shunt circuit through the restraining resistance XB and thus causing the current in the actuating coil 6B to increase, the increase being sufficient to cause the actuating coil 6B to attract the armature 12 of the regulator B and move the first contact 8 of the regulator B to disconnected position. The first contact 8 of the regulator B is not connected to a regulatory resistor 52 but is instead connected to the locking resistor YA and its movement to disconnected position will open the shunt circuit through the locking resistance YA and thus cause the current in the actuating coil 6A to increase to a magnitude well over that required for full regulation, thus locking the regulator A in fully regulated position with all of its contacts 8 in disconnected position. Any further increase in the voltage at the load will cause the current in the actuating coil 6B to increase and hence will cause the second through tenth contacts 8 of the regulator B to move in sequence to disconnected position, thus inserting more and more of the regulatory resistors 52 into the circuit.

By use of the restraining resistance XB, the regulator unit B is positively and effectively restrained from operating until the regulator unit A has regulated to its fullest extent possible, and by use of the locking resistance YA, the regulator unit A is locked in fully regulated position as soon as the regulator unit B takes up the job which the regulator unit A could not finish. Since the connections to the locking resistance YA and the restraining resistance XB are made through contacts 8, a slight reduction in the number of steps of regulation available results, two individual regulator units which normally each can produce ten steps of regulation giving rise, when interconnected as disclosed, to eighteen steps of regulation.

Figure 4:
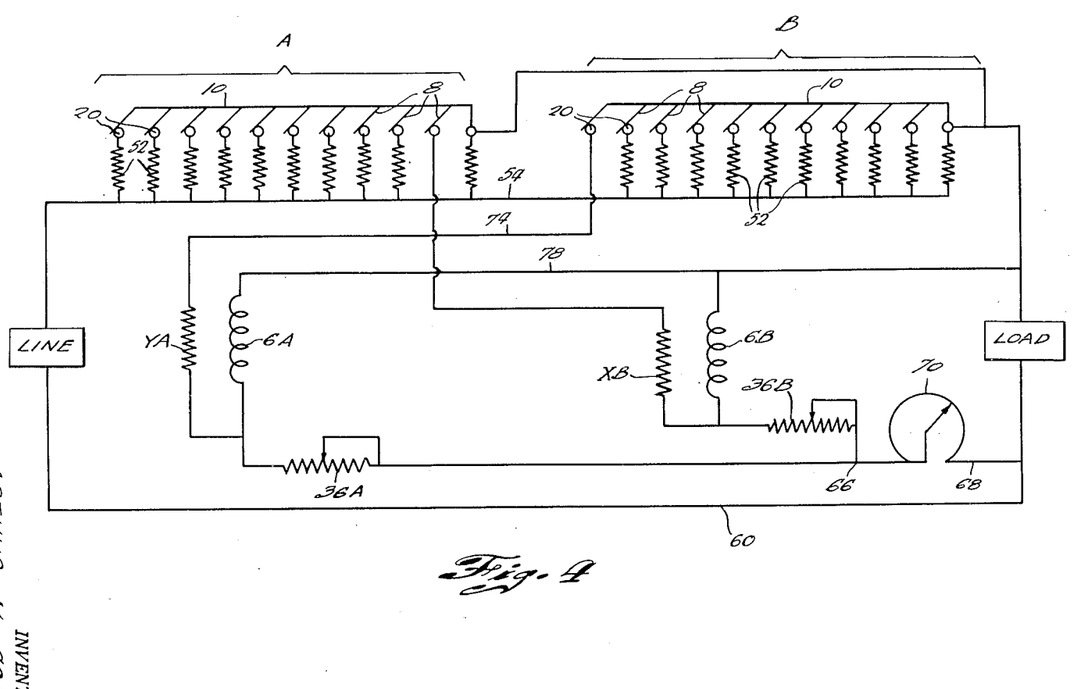
Fig. 4 is a view similar to Fig. 3 but showing the regulatory resistances arranged in parallel.

Fig. 4 discloses an arrangement basically similar to Fig. 3, the primary difference being that the regulatory resistors 52 are connected in parallel with one another instead of in series. In addition, the common lead 10 in each of the regulator units A and B is always connected to the movable contacts 8, movement of these contacts 8 away from connected position with the fixed contacts 20, the latter being electrically separated, sequentially disconnecting more and more of the regulatory resistors 52 and hence increasing the effective amount of regulatory resistance interposed between the line and the load by the regulators. Insofar as this particular contact arrangement is concerned, it merely represents a reversal of parts when compared with that of Fig. 3. The sequential operation of the regulators A and B and the functioning of the restraining resistance XB and the locking resistance YA all take place as described with respect to Fig. 3.

Figure 5:
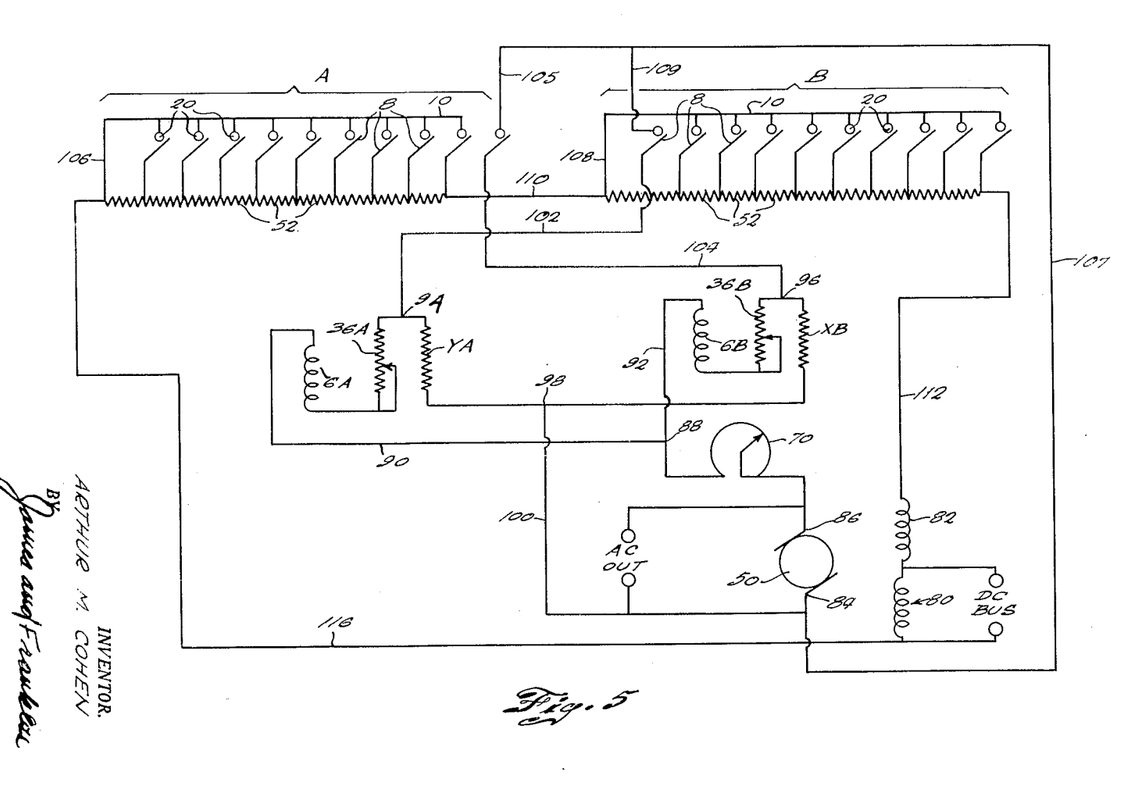
Fig. 5 is a view showing the wiring connections for the sequential operation of two regulator units whose contacts are adapted to be normally open, the wiring being shown in conjunction with the regulation of a D. C.-excited A. C. generator.

Fig. 5 is illustrative of the manner of connecting individual regulator units A and B when those units are of the type in which the contacts 8 are normally disconnected from the fixed contacts 20 and the common lead 10, the specific application shown being the regulation of a D. C.-excited A. C. generator 50 having a shunt field 80 and a bucking regulating field 82. The shunt field 80 is connected across a D. C. bus supplied from an external source and the two ends 84 and 86 of the generator 50 supply a generated A. C. output. The end 86 of the generator 50 is connected via control rheostat 70 to point 88 from which lines 90 and 92 connect to one end of the actuating coils 6A and 6B respectively, the other end of the coils being connected via adjustable resistors 36A and 36B to points 94 and 96 respectively. The locking resistance YA is connected between point 94 and point 98 and restraining resistance XB is connected between point 96 and 98, point 98 being connected by line 100 to the side 84 of the generator 50. Point 94 is also connected by means of line 102 to the first contact of the regulator B, which contact is insulated from the rest of the contacts 20 of the regulator B, and point 96 is connected by means of line 104 to the last contact of the regulator A, which contact is also insulated from the rest of the contacts 20 of the regulator A. The common leads 10 of each of the regulators are connected by means of lines 106 and 108 to the bank of regulatory resistors 52 of each regulator unit A and B, the regulatory resistors 52 being connected in series in each bank and the banks being connected in series with one another by means of line 110, line 112 connecting one end of the bucking field 82 to the last regulatory resistor 52 of the regulator B, the other end of the bucking field 82 being connected to one side of the D. C. bus. The other side of the D. C. bus is connected by means of line 116 to the first regulatory resistor 52 of the regulator unit A.

During normal operation, all of the regulatory resistors 52 will be connected in series with the bucking field 82 and hence the current in the bucking field 82 will be at a minimum. Each of the actuating coils 6A and 6B will be connected across the output of the generator 50, the actuating coil 6A being connected in series with the adjustable resistor 36A and the locking resistance YA, and the actuating coil 6B being connected in series with the adjustable resistor 36B and the restraining resistance XB. Note that in this case the locking and restraining resistances YA and XB are connected in series with the coils 6A and 6B respectively instead of in shunt therewith, as in the previously discussed situations.

The rheostat 70 in conjunction with the adjustable resistors 36A and 36B are set so that, if the voltage of the generator 50 should exceed a certain predetermined value, the current in the coil 6A will be sufficient to start the functioning of the regulator unit A and cause the sequential connection of the contacts 8 to the common lead 10 thereof, thus sequentially shorting out the regulatory resistors 52 so as to increase the current in the bucking field 82 and thus reduce the output voltage of the generator 50. While this occurs, the current in the actuating coil 6B is insufficient to cause the regulator unit B to function. As the voltage of the generator 50 increases, the last contact 8 of the regulator B will connect with the common lead 10. When this occurs, the restraining resistance XB is shorted out, the actuating coil 6B now being connected across the ends 84 and 86 of the generator 50 in series only with the adjustable resistor 36B, the circuit being traced from the end 86 of the generator 50 through the rheostat 70 to the point 88, through the line 92, the actuating coil 6B, and the adjustable resistor 36B to the point 96, through the line 104 and the last contact 8 of the regulator unit A to the line 105 and then through the line 107 to the other end 84 of the generator 50. Since the resistance in series with the actuating coil 6B has thus been decreased, the current in that coil will increase to a point such that the armature 12 will be effectively pulled by the actuating coil 6B and hence regulation by the regulator unit B will take place. The first contact 8 of the regulator unit B, when it connects with the common lead 10 of that regulator, will short out the locking resistance YA, thus placing the actuating coil 6A across the ends 84 and 86 of the generator 50 in series only with the adjustable resistor 36A. This circuit may be traced from the end 86 of the generator 50 through the rheostat 70 to the point 88 and then via line 90 through the actuating coil 6A and the adjustable resistor 36A to the point 94, thence via line 102 to the first contact of the regulator A and through that contact to lines 109 and 107 to the other end 84 of the generator 50. This will therefore cause the current in the actuating coil 6A to increase and hence will cause the regulator A to be locked in its fully regulated position with all of its contacts 8 connected to the common lead 10.

Figure 6:
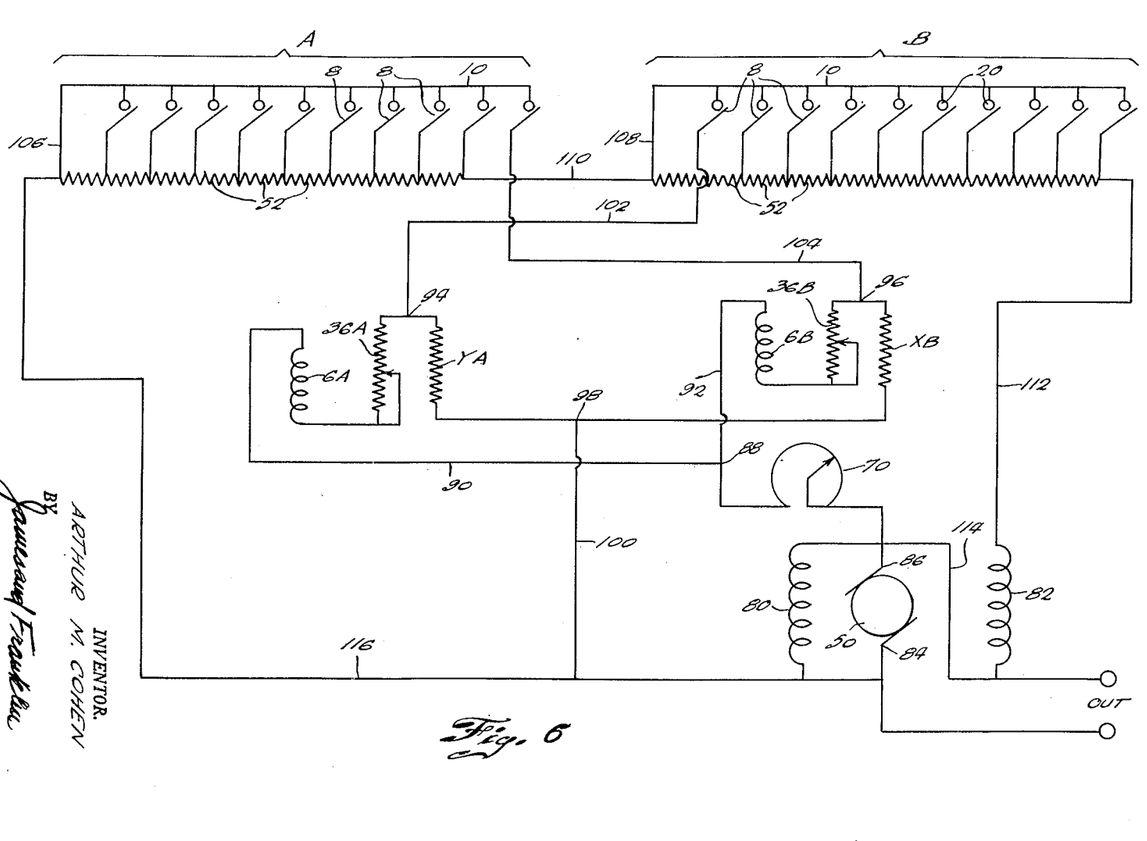
Fig. 6 is a view similar to Fig. 5 but showing the regulators used in conjunction with the regulation of a self-excited generator, all of the contacts of the two regulator units being connected to the common leads of those units.

In Fig. 5, the last contact of the regulator A and the first contact of the regulator B, which are the contacts which control the restraining resistance XB and the locking resistance YA respectively, are insulated from the other contacts of the regulators A and B. Fig. 6 discloses an alternative embodiment used to control a self-excited generator in which all of the contacts of the regulators A and B are connected to the common leads 10 of their respective regulators. The embodiment of Fig. 6 differs from that of Fig. 5 insofar as the operation of the regulators is concerned only in the specific connections employed for connecting and disconnecting the restraining resistance XB and the locking resistance YA. Thus in Fig. 6, when the last contact of the regulator A is moved to connected position, the point 96 is connected to the side 84 of the generator 50 via the line 104, the last contact of the regulator A, the common lead 10 of that regulator, and the leads 106 and 116, the restraining resistance XB thus being shorted out of the circuit. When the first contact of the regulator B closes, the point 94 is connected to the side 84 of the generator 50 via the lead 102, the first contact of the regulator B, the common lead 10 of that regulator, the leads 108 and 110, the next to the last contact of the regulator A, the common lead 10 of that regulator, and the leads 106 and 116.

Figure 7:
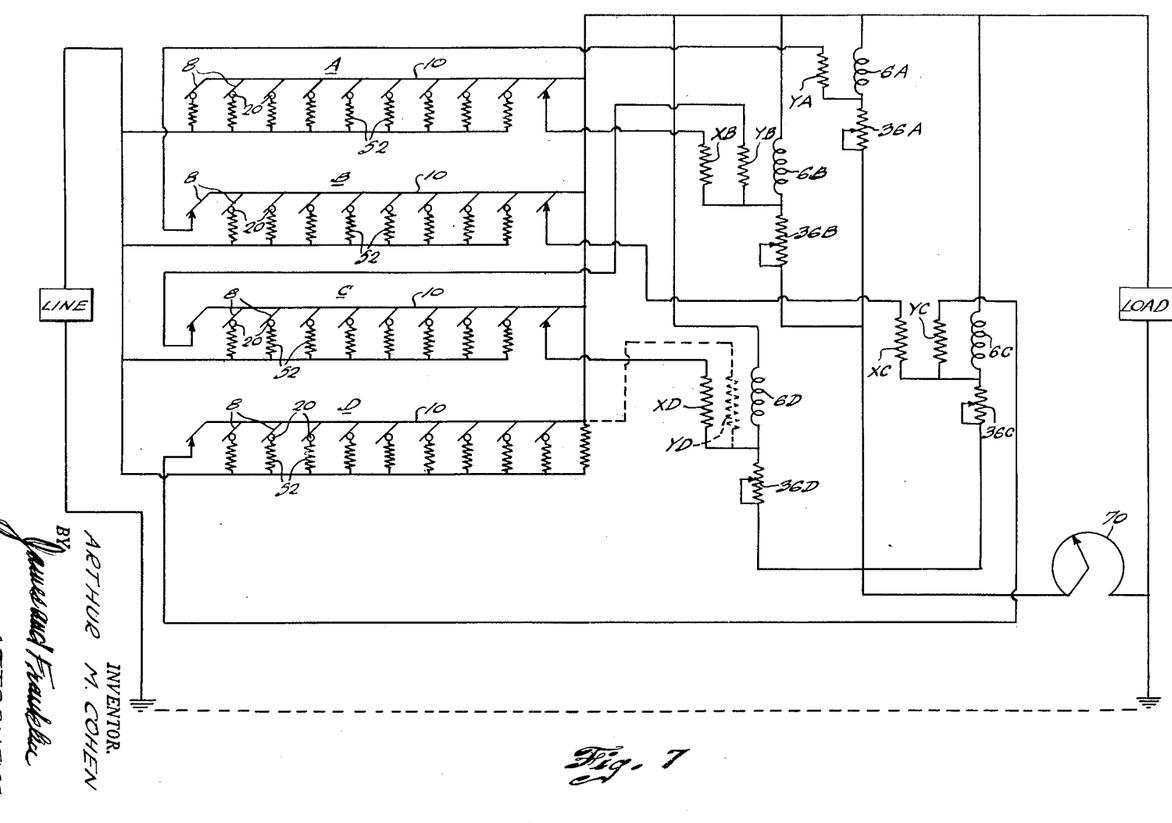
Fig. 7 is a schematic view showing the connections required for sequentially operating four individual regulator units.

Fig. 7 discloses a typical wiring arrangement when four regulator units A, B, C, and D are employed. The actuating coil 6A is normally shunted by locking resistance YA connected to and controlled by the first contact of the regulator B, the actuating coil 6B is normally shunted by restraining resistance XB which is in turn connected to and controlled by the last contact of the regulator unit A, the actuating coil 6B is also shunted by a locking resistance YB connected to and controlled by the first contact of the regulator unit C, the actuating coil 6C has restraining resistance XC shunted thereacross and connected to the last contact of the regulator unit B and also has locking resistance YC shunted thereacross and connected to the first contact of the regulator unit D. The actuating coil 6D has restraining resistance XD shunted thereacross and connected to the last contact of the regulator unit C. In addition, it is usually desirable to have locking resistance XD always connected in shunt with the actuating coil 6D so that the operating conditions of that coil 6D are similar to those of the coil 6A and the coils 6B and 6C when the restraining resistances XB and XC are disconnected therefrom. If the locking resistance YD is not included, the adjustable resistance 36D can compensate therefor but that would require a setting of the adjustable resistor 36D completely out of line when compared with the settings of the resistances 36A, 36B and 36C respectively.

No restraining resistance XA is required in any of the above instances because the setting of the rheostat 70 preconditions the regulator unit A to commence to regulate at the proper moment.

It will be noted, having reference again to the construction disclosed in Figs. 1 and 2, that any desired number of individual regulator units A-D may be secured to the base plate 2 and the requisite number of fixed resistances and adjustable resistors 36 may be secured thereto so as to provide a cascade unit having any desired number of regulator steps within limits. Thus, if two regulator units A and B are employed, as in Figs. 3 and 4, eighteen steps may be provided. If three regulator units A, B, and C are employed, twenty-six steps would be provided, and when four units A, B, C, and D are employed as specifically disclosed in Figs. 1, 2 and 7, thirty-four steps are provided. The fact that the steps are not in mutiples of ten even though each of the individual regulator units has ten contacts arises from the fact that some of those contacts are employed in each unit not for the purpose of cutting regulatory resistors 52 in and out of the circuit but instead in order to ensure the proper sequential operation of the regulator units, first A, then B, then C, and then D.

The individual regulator units themselves are of exactly the same type as are normally used individually. Hence, the only inventory which the manufacturer must carry is an inventory of base plates, of standardized individual regulator units useable either in the cascade unit or alone, and a plurality of standardized fixed and adjustable resistance units interchangeable from one cascade unit to another. Each time a special problem is presented, the manufacturer, by a judicious selection of regulator units and resistor units, all of standard construction, can provide a cascade unit particularly suited to the special application in question, and this without any detailed engineering. The only components which must be tailor-made to the application are the individual regulatory resistors 52 which are external from the cascade unit and form no part thereof. The savings to the manufacturer in standardization and lack of inventory are equally attractive to the user, being reflected in reduced initial cost and upkeep, and in addition the user has the benefit of a unitary regulator instead of a complicated network and has the reassurance that if any part of that unitary regulator should fail, not only is it not necessary to discard the entire unit, but the replacement of that part is assured because the part is standardized. Moreover, use of the cascade unit is facilitated by the fact that the initial adjustments required in the regulating resistances 36 may be easily and simply made and are not particularly critical. Thus, when in the past resistances have been inserted in series with actuating coils so that one regulator will pick up as soon as the other regulator has finished, the values of the resistances had to be very precisely fixed. According to the method of interconnection here disclosed, however, the settings of the adjustable resistors 36 are not nearly so critical since the cutting in or out of an individual regulator unit is primarily controlled by the automatic cutting in or out of the restraining resistances X and the locking resistances Y, the magnitudes of each of which may be appreciable.

The advantages of the present construction are therefore extremely marked both from an operational and commercial point of view. It will be apparent that while various methods of interconnection are here disclosed, these are but typical of many variations which may be made therein. It will also be apparent that while only one structure is here disclosed, many variations may be made in the details thereof, both in the number and arrangement of regulator units and resistances and in the construction of the regulator units themselves, all without departing from the spirit of the invention as defined in the following claims.

I claim:

1. A cascade regulator comprising a base plate, first and second individual regulator units adapted to function in sequence mounted on said plate, each of said regulator units comprising an actuating coil adapted to be connected across an external voltage source and a plurality of individual contacts all normally assuming either a connected or disconnected position with respect to cooperating contacts and being movable in sequence to the other position as the current carried by said actuating coil increases, restraining and locking resistances on said base plate, electrical connections between said restraining resistance, the last contact of said first regulator unit and the actuating coil of said second regulator unit so as to connect said restraining resistance in circuit with said actuating coil so long as said last contact is in its normal position in such a manner as to reduce the current flowing therein for restraining said second regulator unit from functioning until said last contact is moved out of its normal position, and electrical connections between said locking resistance, the first contact of said second regulator unit and the actuating coil of said first regulator unit so as to connect said locking resistance in circuit with said actuating coil so long as said first contact is in its normal position in such a manner as to increase the current flowing therein for locking said first regulator unit in position with all of its contacts in non-normal position whenever said first contact is out of its normal position.

2. A cascade regulator comprising a base plate, first and second individual regulator units adapted to function in sequence mounted on said plate, each of said regulator units comprising an actuating coil adapted to be connected across an external voltage source and a plurality of individual contacts all normally assuming either a connected or a disconnected position with respect to cooperating contacts and being movable in sequence to the other position as the current carried by said actuating coil increases, a pair of adjustable resistances on said base plate, restraining and locking resistances on said base plate, electrical connections connecting each of said adjustable resistances to the actuating coil of one of said regulator units, variation of said adjustable resistance controlling the amount of current in said actuating coil for a given voltage of said source, electrical connections between said restraining resistance, the last contact of said first regulator unit and the actuating coil of said second regulator unit so as to connect said restraining resistance in circuit with said actuating coil so long as said last contact is in its normal position in such a manner as to reduce the current flowing therein for restraining said second regulator unit from functioning until said last contact is moved out of its normal position, and electrical connections between said locking resistance, the first contact of said second regulator unit and the actuating coil of said first regulator unit so as to connect said locking resistance in circuit with said actuating coil so long as said first contact is in its normal position in such a manner as to increase the current flowing therein for locking said first regulator unit in position with all of its contacts in non-normal position whenever said first contact is out of its normal position.

3. A cascade regulator comprising a base plate, first and second individual regulator units adapted to function in sequence mounted on said plate, each of said regulator units comprising an actuating coil adapted to be connected across an external voltage source and a plurality of individual contacts all normally in connected position with respect to cooperating contacts but operatively connected to said actuating coil so as to be movable in sequence into disconnected position with respect to said cooperating contacts as the current carried by said actuating coil increases, electrical connections between said restraining resistance, the last contact of said first regulator unit and the actuating coil of said second regulator unit so as to connect said restraining resistance in shunt across said actuating coil only so long as said last contact is in connected position, thus causing the current in said actuating coil to be reduced, for the purpose of restraining said second regulator unit from functioning, until said last contact is in disconnected position, and electrical connections between said locking resistance, the first contact of said second regulator unit and the actuating coil of said first regulator unit so as to connect said locking resistance in shunt across said actuating coil only so long as said first contact is in connected position, thus causing the current in said actuating coil to increase, for the purpose of locking said first regulator unit in position with all of its contacts in disconnected position, whenever said first contact is in disconnected position.

4. A cascade regulator comprising a base plate, first and second individual regulator units adapted to function in sequence mounted on said plate, each of said regulator units comprising an actuating coil adapted to be connected across an external voltage source and a plurality of individual contacts all normally in connected position with respect to cooperating contacts but operatively connected to said actuating coil so as to be movable in sequence into disconnected position with respect to said cooperating contacts as the current carried by said actuating coil increases, a pair of adjustable resistances on said base plate, restraining and locking resistances on said base plate, electrical connections connecting each of said adjustable resistances to the actuating coil of one of said regulator units, variation of said adjustable resistances controlling the amount of current in said actuating coils for a given voltage of said source, electrical connections between said restraining resistance, the last contact of said first regulator unit and the actuating coil of said second regulator unit so as to connect said restraining resistance in shunt across said actuating coil only so long as said last contact is in connected position, thus causing the current in said actuating coil to be reduced, for the purpose of restraining said second regulator unit from functioning, until said last contact is in disconnected position, and electrical connections between said locking resistance, the first contact of said second regulator unit and the actuating coil of said first regulator unit so as to connect said locking resistance in shunt across said actuating coil only so long as said first contact is in connected position, thus causing the current in said actuating coil to increase, for the purpose of locking said first regulator unit in position with all of its contacts in disconnected position, whenever said first contact is in disconnected position.

5. A cascade regulator comprising a base plate, first and second individual regulator units adapted to function in sequence mounted on said plate, each of said regulator units comprising an actuating coil adapted to be connected across an external voltage source, a common lead and a plurality of individual contacts all normally in a position connected to said common lead but operatively connected to said actuating coil so as to be movable in sequence into disconnected position with respect to said common lead as the current carried by said actuating coil increases, restraining and locking resistances on said base plate, an electrical connection between one end of said restraining resistance and one end of the actuating coil of said second regulator unit, an electrical connection between the other end of said restraining resistance and the last contact of said first regulator unit, the common lead of said first regulator unit being connected to the same side of said voltage source as the other end of said actuating coil, said restraining resistance thereby being connected in shunt with said actuating coil so long as said last contact is in connected position, thus causing the current in said actuating coil to be reduced, for the purpose of restraining said second regulator unit from functioning, until said last contact is in disconnected position, an electrical connection between one end of said locking resistance and one end of the actuating coil of said first regulator unit, an electrical connection between the other end of said locking resistance and the first contact of said second regulator unit, the common lead of said second regulator unit being connected to the same side of said voltage source as the other end of said actuating coil, thereby connecting said locking resistance in shunt with said actuating coil so long as said first contact is in connected position, thus causing the current in said actuating coil to increase, for the purpose of locking said first regulator unit in position with all of its contacts in disconnected position, whenever said first contact is in disconnected position.

6. A cascade regulator comprising a base plate, first and second individual regulator units adapted to function in sequence mounted on said plate, each of said regulator units comprising an actuating coil adapted to be connected across an external voltage source, a common lead and a plurality of individual contacts all normally in a position connected to said common lead but operatively connected to said actuating coil so as to be movable in sequence into a disconnected position with respect to said common lead as the current carried by said actuating coil increases, a pair of adjustable resistances on said base plate, restraining and locking resistances on said base plate, electrical connections connecting each of said adjustable resistances to the actuating coil of one of said regulator units, variation of said adjustable resistances controlling the amount of current in said actuating coils for a given voltage of said source, an electrical connection between one end of said restraining resistance and one end of the actuating coil of said second regulator unit, an electrical connection between the other end of said restraining resistance and the last contact of said first regulator unit, the common lead of said first regulator unit being connected to the same side of said voltage source as the other end of said actuating coil, said restraining resistance thereby being connected in shunt with said actuating coil so long as said last contact is in connected position, thus causing the current in said actuating coil to be reduced for the purpose of restraining said second regulator unit from functioning until said last contact is in disconnected position, an electrical connection between one end of said locking resistance and one end of the actuating coil of said first regulator unit, an electrical connection between the other end of said locking resistance and the first contact of said second regulator unit, the common lead of said second regulator unit being connected to the same side of said voltage source as the other end of said actuating coil, thereby connecting said locking resistance in shunt with said actuating coil so long as said first contact is in connected position, thus causing the current in said actuating coil to increase, for the purpose of locking said first regulator unit in position with all of its contacts in disconnected position, whenever said first contact is in disconnected position.

7. A cascade regulator comprising a base plate, first and second individual regulator units adapted to function in sequence mounted on said plate, each of said regulator units comprising an actuating coil adapted to be connected across an external voltage source and a plurality of individual contacts all normally in disconnected position with respect to cooperating contacts but movable in sequence into connected position with respect thereto as the current carried by said actuating coil increases, restraining and locking resistances on said base plate, electrical connections between said restraining resistance, the last contact of said first regulator unit and the actuating coil of said second regulator unit so as to connect said restraining resistance in series with said actuating coil only so long as said last contact is in disconnected position, thus causing the current in said actuating coil to be reduced, for the purpose of restraining said second regulator unit from functioning, until said last contact is in connected position, and electrical connections between said locking resistance, the first contact of said second regulator unit and the actuating coil of said first regulator so as to connect said locking resistance in series with said actuating coil only so long as said first contact is in disconnected position, thus causing the current in said actuating coil to increase, for the purpose of locking said first regulator unit in position with all of its contacts in connected position, when said first contact is in connected position.

8. A cascade regulator comprising a base plate, first and second individual regulator units adapted to function in sequence mounted on said plate, each of said regulator units comprising an actuating coil adapted to be connected across an external voltage source and a plurality of individual contacts all normally in disconnected position with respect to cooperating contacts but movable in sequence into connected position with respect thereto as the current carried by said actuating coil increases, a pair of adjustable resistances on said base plate, restraining and locking resistances on said base plate, electrical connections connecting each of said adjustable resistances to the actuating coil of one of said regulator units, variation of said adjustable resistances controlling the amount of current in said actuating coils for a given voltage of said source, electrical connections between said restraining resistance, the last contact pair of said first regulator unit and the actuating coil of said second regulator unit so as to connect said restraining resistance in series with said actuating coil only so long as said last contact is in disconnected position, thus causing the current in said actuating coil to be reduced, for the purpose of restraining said second regulator unit from functioning, until said last contact is in connected position, and electrical connections between said locking resistance, the first contact of said second regulator unit and the actuating coil of said first regulator unit so as to connect said locking resistance in series with said actuating coil only so long as said first contact is in disconnected position, thus causing the current in said actuating coil to increase, for the purpose of locking said first regulator unit in position with all of its contacts in connected position, when said first contact is in connected position.

9. A cascade regulator comprising a base plate, first and second individual regulator units adapted to function in sequence mounted on said plate, each of said regulator units comprising an actuating coil adapted to be connected across an external voltage source, a common lead and a plurality of individual contacts all normally in disconnected position with respect to said common lead but movable in sequence into a connected position therewith as the current carried by said actuating coil increases, restraining and locking resistances on said base plate, an electrical connection between one end of said restraining resistance and one side of said voltage source, an electrical connection between the other end of said restraining resistance and one end of the actuating coil of said second regulator unit, the other end of said actuating coil being connected to the other side of said voltage source, an electrical connection between the other end of said restraining resistance and the last contact of said first regulator unit, said common lead being electrically connected to said one side of said voltage source, whereby said restraining resistance is connected in series with said actuating coil so long as said last contact is in disconnected position but is shorted out whenever said last contact is in connected position, thus causing the current in said actuating coil to be reduced, for the purpose of restraining said second regulator unit from functioning, until said last contact is in connected position, an electrical connection between one end of said locking resistance and one side of said voltage source, an electrical connection between the other end of said locking resistance and one end of the actuating coil of said first regulator unit, the other end of said actuating coil being connected to the other side of said voltage source, and an electrical connection between said other end of said locking resistance and the first contact of said second regulator unit, the common lead of said second regulator unit being connected to said one side of said voltage source, said locking resistance thereby being connected in series with said actuating coil so long as said first contact is in disconnected position but being shorted out whenever said first contact is in connected position, thus causing the current in said actuating coil to increase, for the purpose of locking said first regulator unit in position with all of its contacts in connected position, when said first contact is in connected position.

10. A cascade regulator comprising a base plate, first and second individual regulator units adapted to function in sequence mounted on said plate, each of said regulator units comprising an actuating coil adapted to be connected across an external voltage source, a common lead and a plurality of individual contacts all normally in disconnected position with respect to said common lead but movable in sequence into connected position therewith as the current carried by said actuating coil increases, a pair of adjustable resistances on said base plate, restraining and locking resistances on said base plate, electrical connections connecting each of said adjustable resistances to the actuating coil of one of said regulator units, variation of said adjustable resistances controlling the amount of current in said actuating coils for a given voltage of said source, an electrical connection between one end of said restraining resistance and one side of said voltage source, an electrical connection between the other end of said restraining resistance and one end of the actuating coil of said second regulator unit, the other end of said actuating coil being connected to the other side of said voltage source, an electrical connection between the other end of said restraining resistance and the last contact of said first regulator unit, said common lead being electrically connected to said one side of said voltage source, whereby said restraining resistance is connected in series with said actuating coil so long as said last contact is in disconnected position but is shorted out whenever said last contact is in connected position, thus causing the current in said actuating coil to be reduced, for the purpose of restraining said second regulator unit from functioning, until said last contact is in connected position, an electrical connection between one end of said locking resistance and one side of said voltage source, an electrical connection between the other end of said locking resistance and one end of the actuating coil of said first regulator unit, the other end of said actuating coil being connected to the other side of said voltage source, and an electrical connection between said other end of said locking resistance and the first contact of said second regulator unit, the common lead of said second regulator unit being connected to said one side of said voltage source, said locking resistance thereby being connected in series with said actuating coil so long as said first contact is in disconnected position but being shorted out whenever said first contact is in connected position, thus causing the current in said actuating coil to increase, for the purpose of locking said first regulator unit in position with all of its contacts in connected position, when said first contact is in connected position.

11. A cascade regulator comprising a base plate, first and second individual regulator units adapted to function in sequence mounted on said base plate, each of said regulator units comprising an actuating coil adapted to be connected across an external voltage source, a common lead, a plurality of individual contacts all normally in disconnected position with respect to said common lead but movable in sequence into connected position therewith as the current carried by said actuating coil increases, and an additional contact normally in disconnected position with respect to a cooperating contact but movable into a connected position therewith as the current carried by said actuating coil increases, said additional contact and its cooperating contact being disconnected from said common lead, said additional contact being the last contact to move to connected position in the first of said regulators and being the first contact to move to connected position in the second of said regulators, restraining and locking resistances on said base plate, an electrical connection between one end of said restraining resistance and one side of said voltage source, an electrical connection between the other end of said restraining resistance and one end of the actuating coil of said second regulator unit, the other end of said actuating coil being connected to the other side of said voltage source, an electrical connection between the other end of said restraining resistance and the additional contact of said first regulator unit, and an electrical connection between the cooperating contact for said additional contact and said one side of said voltage source, whereby said restraining resistance is connected in series with said actuating coil so long as said additional contact is in disconnected position but is shorted out whenever said additional contact is in connected position, thus causing the current in said actuating coil to be reduced, for the purpose of restraining said second regulator unit from functioning, until said additional contact is in connected position, an electrical connection between one end of said locking resistance and one side of said voltage source, an electrical connection between the other end of said locking resistance and one end of the actuating coil of said first regulator unit, the other end of said actuating coil being connected to the other side of said voltage source, an electrical connection between said other end of said locking resistance and said additional contact of said second regulator unit, the cooperating contact for said additional contact being connected to said other side of said voltage source, said locking resistance thereby being connected in series with said actuating coil so long as said additional contact is in its connected position but being shorted out whenever said additional contact is in connected position, thus causing the current in said actuating coil to increase, for the purpose of locking said first regulator unit in position with all of its contacts in connected position, when said additional contact is in connected position.

12. A cascade regulator comprising a base plate, first and second individual regulator units adapted to function in sequence mounted on said base plate, each of said regulator units comprising an actuating coil adapted to be connected across an external voltage source, a common lead, a plurality of individual contacts all normally in disconnected position with respect to said common lead but movable in sequence into connected position therewith as the current carried by said actuating coil increases, and an additional contact normally in disconnected position with respect to a cooperating contact but movable into a connected position therewith as the current carried by said actuating coil increases, said additional contact and its cooperating contact being disconnected from said common lead, said additional contact being the last contact to move to connected position in the first of said regulators and being the first contact to move to connected position in the second of said regulators, a pair of adjustable resistances on said base plate, restraining and locking resistances on said base plate, electrical connections connecting each of said adjustable resistances to the actuating coil of one of said regulator units, variation of said adjustable resistances controlling the amount of current in said actuating coils for a given voltage of said source, an electrical connection between one end of said restraining resistance and one side of said voltage source, an electrical connection between the other end of said restraining resistance and one end of the actuating coil of said second regulator unit, the other end of said actuating coil being connected to the other side of said voltage source, an electrical connection between the other end of said restraining resistance and the additional contact of said first regulator unit, and an electrical connection between the cooperating contact for said additional contact and said other side of said voltage source, whereby said restraining resistance is connected in series with said actuating coil so long as said additional contact is in disconnected position but is shorted out whenever said additional contact is in connected position, thus causing the current in said actuating coil to be reduced, for the purpose of restraining said second regulator unit from functioning, until said additional contact is in connected position, an electrical connection between one end of said locking resistance and one side of said voltage source, an electrical connection between the other end of said locking resistance and one end of the actuating coil of said first regulator unit, the other end of said actuating coil being connected to the other side of said voltage source, an electrical connection between said other end of said locking resistance and said additional contact of said second regulator unit, the cooperating contact for said additional contact being connected to said other side of said voltage source, said locking resistance thereby being connected in series with said actuating coil so long as said additional contact is in disconnected position but being shorted out whenever said additional contact is in connected position, thus causing the current in said actuating coil to increase, for the purpose of locking said first regulator unit in position with all of its contacts in connected position, when said additional contact is in connected position.

ARTHUR M. COHEN.

No references cited.